(12) United States Patent
Jung

(10) Patent No.: US 7,527,372 B1
(45) Date of Patent: May 5, 2009

(54) GLASSES HAVING SIDE SHIELDS

(75) Inventor: Sung Mo Jung, Gyeongsangbuk-do (KR)

(73) Assignee: Frame-Tec Co., Ltd., Daegu (KR)

( * ) Notice: Subject to any disclaimer, the term of this patent is extended or adjusted under 35 U.S.C. 154(b) by 0 days.

(21) Appl. No.: 12/178,389

(22) Filed: Jul. 23, 2008

(30) Foreign Application Priority Data

May 14, 2008 (KR) .................. 20-2008-0006259 U

(51) Int. Cl.
*G02C 7/10* (2006.01)
*A61F 9/04* (2006.01)

(52) U.S. Cl. .................................. 351/44; 2/13; 2/449

(58) Field of Classification Search ............... 351/44, 351/41, 158, 111, 123; 2/13, 449, 231, 240, 2/12, 15, 426, 432, 440, 448
See application file for complete search history.

(56) References Cited

U.S. PATENT DOCUMENTS

| 5,748,278 | A  | * | 5/1998  | Simmons, Sr. ............... 351/44 |
| 5,940,161 | A  | * | 8/1999  | Hirschman et al. ........... 351/44 |
| 6,270,216 | B1 | * | 8/2001  | DiChiara ...................... 351/44 |
| 6,393,609 | B1 | * | 5/2002  | Simmons, Sr. .................... 2/13 |
| 6,715,873 | B2 | * | 4/2004  | Nahmias ....................... 351/44 |
| 6,832,389 | B2 | * | 12/2004 | Simmons, Sr. .................... 2/13 |
| 6,910,767 | B2 | * | 6/2005  | Froissard ...................... 351/44 |
| 7,013,495 | B2 | * | 3/2006  | Simmons, Sr. .................. 2/440 |

* cited by examiner

*Primary Examiner*—Hung X Dang
(74) *Attorney, Agent, or Firm*—Lowe Hauptman Ham & Berner, LLP

(57) ABSTRACT

The present invention provides glasses having side shields, which include glasses bodies and side shields, each of the glasses bodies having a double hinged structure by means of a hinged portion and an elastically hinged portion formed at each of temples, each of the side shields having a movement space formed in such a way that one side of the side shield is inclined outwardly, thereby enhancing a feeling of wearing, preventing a change in shape of the temples when the temples are spread outwardly by an external force, and restoring the temples to their original positions in safe.

1 Claim, 5 Drawing Sheets

GLASSES HAVING SIDE SHIELDS

BACKGROUND OF THE INVENTION

1. Field of the Invention

The present invention relates to glasses having side shields, and more particularly, to glasses having side shields, which have temples and side shields respectively joined to the temples of improved structures so as to protect a wearer's eyes from foreign substances and allows the temples to be freely spread to the outside without any hindrance of the side shields so as to enhance a feeling of wearing.

2. Background Art

In general, glasses having side shields can prevent that a wearer's eyes are damaged owing to dusts and other foreign substances entering each of spaces between lens frames and temples when the wearer acts in the open air or works in a place where the dusts and foreign substances may be generated.

That is, as shown in FIG. 5, conventional glasses having side shields includes: glasses bodies 101, each of the glasses bodies 101 having a lens frame 1 on which a lens 11 is mounted, a coupling member 12 projecting from one side of the lens frame 1, and a temple 3 collapsibly connected to the lens frame 1 by means of a hinge (a), the hinge (a) being formed in such a way that a first hinge piece 13 of the coupling member 12 and a second hinge piece 21 disposed at an end of the temple 3 overlap each other; and side shields 4, each of the side shields 4 having a side plate 41 opened and curved from one side to the other side thereof, a retaining jaw 43 formed at one side end of the side plate 41, and a temple seating portion 42 projecting in a centrally longitudinal direction of the side plate 41 and having upper and lower pressing rods 44, wherein each of the side shields 4 fastens the temple 3 by means of the vertically pressing rod 44 after the retaining jaw 43 of the side plate 41 is retained to an outer periphery of one side of the lens frame 1 and the temple 3 is inserted into the temple seating portion 42 formed at the center of the side plate 41.

Accordingly, since the glasses have the side shields 4 joined to both sides of the lens frames and having the side plates 41, the glasses having the side shields can protect the wearer's eyes by preventing that dusts and other foreign substances enter the spaces between the lens frames and the temples when the wearer acts in the open air or works in a place where the dusts and foreign substances may be generated.

However, the conventional glasses having the side shields can prevent entering of the dusts and foreign substances into the spaces formed between the lens frames and the temples, but have a problem in that it deteriorates a feeling of wearing.

The conventional glasses having the side shields will be described in more detail.

As shown in FIG. 5, in the conventional glasses having the side shields, each of the lens frames and each of the temples are connected with each other by means of a simply hinged structure, and the side shields are closely joined to both sides of the lens frames 1 in such a way as to surround the outer peripheries of the lens frames and the temples.

When the wearer wears the glasses, the conventional glasses having the side shields have several problems in that a feeling of wearing is deteriorated since the temples of the glasses pressurize the wearer's temples, and in that the side shields may be separated from the glasses or damaged and the temples of the glasses may be changed in shape if the temples are spread outwardly by an external force.

In order to improve the feeling of wearing and prevent a change in shape of the temples of the glasses, in case of glasses according to a specific prior art, the temples 3 and the lens frames 1 are connected with each other through elastically hinged portions 301 so that the temples 3 are spread outwardly at a predetermined angle by the elastically hinged portions 301.

Here, each of the elastically hinged portions 301 has a structure that a projecting rod 31 having an insertion recess 31' is integrally formed at one side end of each temple 3 and an elastic shaft 33 having a spring 32 elastically mounted thereon is inserted and mounted into the insertion recess 31', and then, one side end of the elastic shaft 33 is hinge-coupled with the first hinge piece 13 of the lens frame 1. When the temples are spread outwardly by the external force, the elastic shafts are varied by the springs and elastically hold the temples, so that the temples can be spread outwardly and restored to their original positions at a predetermined angle in safe to thereby enhance the feeling of wearing.

However, in case where the side shields are integrally joined to the sides of the lens frames of the glasses having the elastically hinged portions, also the glasses having the elastically hinged portions have the same problems as the above-mentioned prior art since the side shields obstruct the spread of the temples, and hence, it was impossible to use the glasses having the elastically hinged portions when the glasses were constructed to have the side shields.

SUMMARY OF THE INVENTION

Accordingly, the present invention has been made in an effort to solve the above-mentioned problems occurring in the prior arts, and it is an object of the present invention to provide glasses having side shields, which include glasses bodies and side shields, each of the glasses bodies having a double hinged structure by means of a hinged portion and an elastically hinged portion formed at each of temples, each of the side shields having a movement space formed in such a way that one side of the side shield is inclined outwardly, thereby enhancing a feeling of wearing, preventing a change in shape of the temples when the temples are spread outwardly by an external force, and restoring the temples to their original positions in safe.

To accomplish the above object, according to the present invention, there is provided glasses having side shields comprising: glasses bodies, each of the glasses bodies having a lens frame on which a lens is mounted, a coupling member disposed at one side of the lens frame, a connection rod connected with a temple and joined to an end of the coupling member in such a way that the temple can be collapsed in an inward direction of the lens frame, the connection rod having a first hinge piece and a second hinge piece formed at both sides thereof to form a hinge, wherein the second hinge piece of one end of the connection rod is hingeably coupled to the first hinge piece of the coupling member of the lens frame and the first hinge piece of the other end of the connection rod is hingeably coupled to an elastic shaft elastically mounted inside a projecting rod of the temple by a spring, whereby the temple can be collapsed inwardly and spread outwardly at a predetermined angle; and side shields, each of the side shields having a side plate opened and curved from one side to the other side thereof, a retaining jaw formed at one side end of the side plate, and a temple seating portion projecting in a centrally longitudinal direction of the side plate and having upper and lower pressing rods, the temple seating portion (42) having a movement space (45) of a predetermined width formed in such a way that one side end thereof extends outwardly inclinedly, wherein the temples, the connection rods, and the coupling members of the lens frames of the glasses bodies are partially fit into the temple seating portions of the side shields and fastened with the upper and lower pressing rods of the side shields.

As described above, in the glasses having the side shields according to the present invention, since each of the temples has the double hinged structure by means of the hinged portion and the elastically hinged portion, the temples can be collapsed inwardly by the hinged portions and spread outwardly at a predetermined angle in safe by the elastically hinged portions.

In this instance, since one side of the temple seating portion of each of the side shields joined to both sides of the glasses is inclined outwardly to provide the movement space, the temples can be spread outwardly along the movement spaces in safe without any hindrance of the side shields, whereby the glasses having the side shields according to the present invention can enhance a feeling of wearing, prevent a change in shape of the temples when the temples are spread outwardly, and restore the temples to their original positions in safe.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 2:
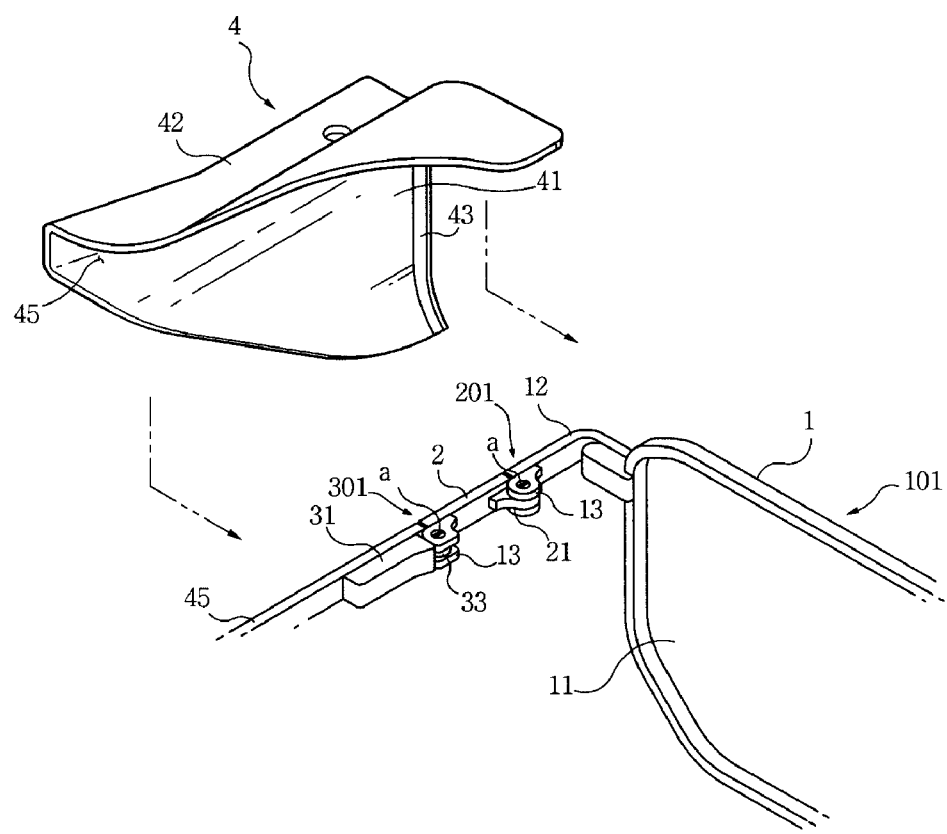
FIG. 2 is an exploded view showing the side shield is separated from the glasses according to the present invention.
Figure 3:
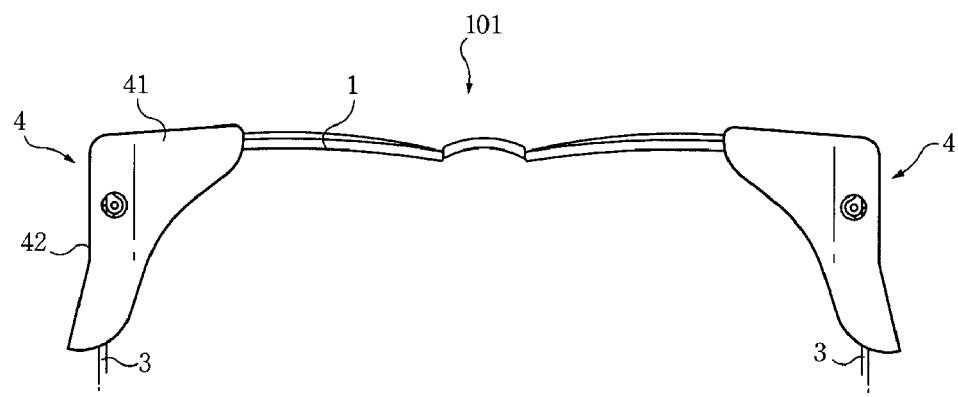
FIG. 3 is a plan view of the present invention.

As shown in FIG. 2, glasses having side shields according to the present invention include glasses bodies 101 and side shields 4. Each of the glasses bodies 101 includes a lens frame 1 on which a lens 11 is mounted, a coupling member 12 disposed at one side of the lens frame 1, a connection rod 2 connected with a temple 3 and joined to an end of the coupling member 12 in such a way that the temple 3 can be collapsed inwardly, the connection rod 2 having a first hinge piece 13 and a second hinge piece 21 formed at both sides thereof to form a hinge (a), wherein the second hinge piece 21 of one end of the connection rod 2 is hingeably coupled to the first hinge piece 13 of the coupling member 12 of the lens frame 1 to thereby form a hinged portion 201 so that the temple 3 and the connection rod 2 can be collapsed inwardly by means of the hinged portion 201, and wherein the first hinge piece 13 of the other end of the connection rod 2 is hingeably coupled to the elastic shaft 33 elastically mounted inside a projecting rod 31 of the temple 3 by a spring 32 to thereby form an elastically hinged portion 301 so that the temple 3 can be spread outwardly from the connection rod 2 at a predetermined angle in safe by the elastically hinged portion 301 and be restored to its original position by elasticity of the spring 32.

Furthermore, each of the side shields 4 includes a side plate 41 opened and curved from one side to the other side thereof, a retaining jaw 43 formed at one side end of the side plate 41, and a temple seating portion 42 projecting in a centrally longitudinal direction of the side plate 41 and having upper and lower pressing rods 44, wherein one side end of the temple seating portion 42 projecting in the longitudinal direction of the side plate 41 is inclined outwardly to thereby form a movement space 45 of a predetermined width.

Figure 1:
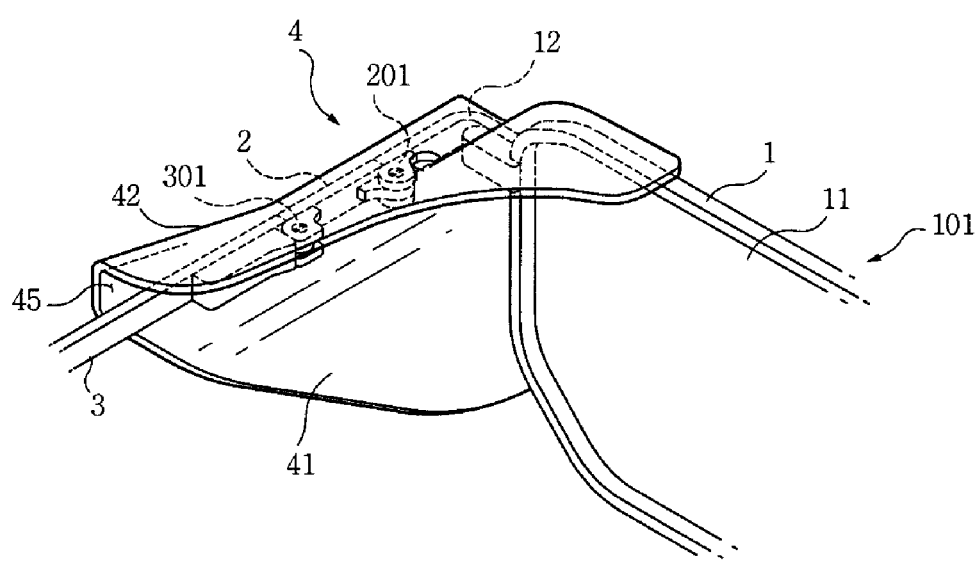
FIG. 1 is a partially enlarged view of glasses having side shields according to the present invention.

As shown in FIG. 1, each of the glasses bodies 101 and each of the side shields 4 are joined with each other through the steps of holding the retaining jaw 43 of the side plate 41 to an outer periphery of the lens frame 1, partially fitting the temple 3, the connection rod 2 and the coupling member 12 of the lens frame 1 into the temple seating portion 42 of the side plate 41, and fastening them with the upper and lower pressing rods 44.

Accordingly, when the wearer acts in the open air or works in a place where dusts and foreign substances may be generated, the glasses having the side shields can protect the wearer's eyes by preventing that foreign substances enter a space formed between the lens frame and the temple, and enhance a feeling of wearing and prevent a transformation of the lens frame since the temple is spread outwardly in safe by means of the elastically hinged portion.

Here, when the temple is spread outwardly from the connection rod at a predetermined angle by means of the elastically hinged portion, since one side of the temple seating portion formed on the side plate of the side shield is inclined outwardly, each of the side shields joined to both sides of the glasses provides the movement space formed therein.

Figure 4A:
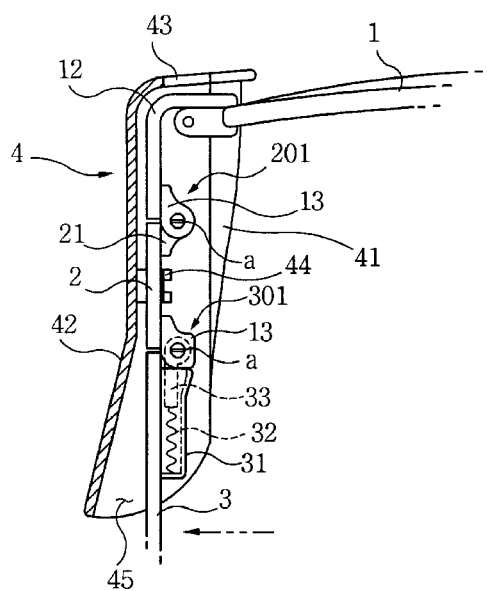
FIGS. 4A and 4B are a partially sectional view showing a state where a wearer wears the glasses having the side shields according to the present invention.
Figure 4B:
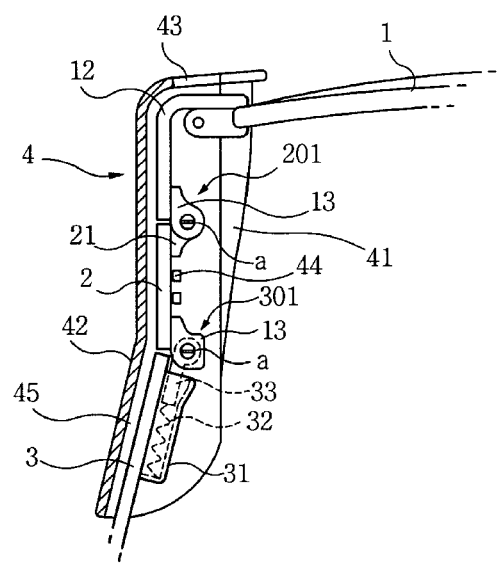
Figure 5:
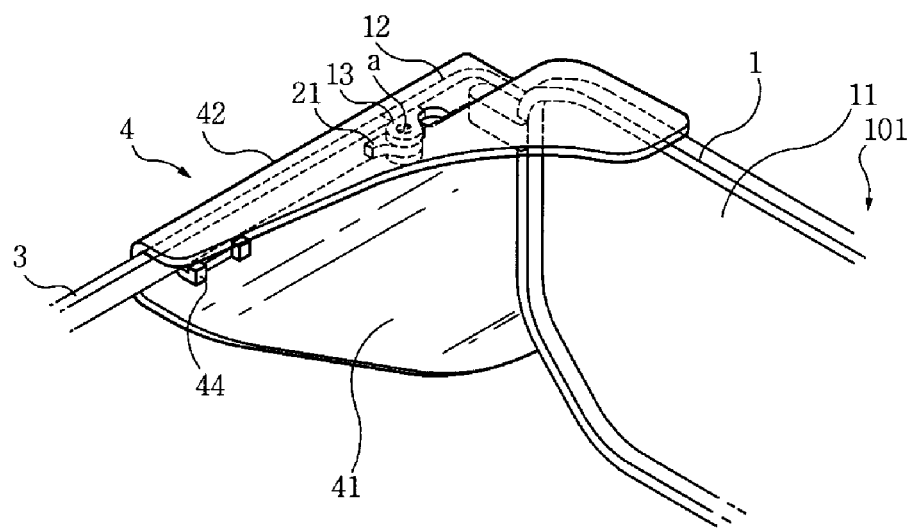
FIG. 5 is a partially enlarged view of glasses having side shields according to a prior art.

As shown in FIG. 4A and FIG. 4B, when each of the temples is spread outwardly, since each of the side shields has the movement space formed at one side end of the temple seating portion to correspond to the spread of the temple, each of the temples can be spread and restored in safe within the movement space.

As described above, the glasses having the side shields according to the present invention can enhance the feeling of wearing, prevent the change in shape of the temples when the temples are spread outwardly by an external force, and restore the temples to their original positions in safe since the temples can be spread outwardly in safe without any hindrance of the side shields.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. Glasses having side shields comprising:
glasses bodies (101), each of the glasses bodies (101) having a lens frame (1) on which a lens (11) is mounted, a coupling member (12) disposed at one side of the lens frame (1), a connection rod (2) connected with a temple (3) and joined to an end of the coupling member (12) in such a way that the temple (3) can be collapsed in an inward direction of the lens frame (1), the connection rod (2) having a first hinge piece (13) and a second hinge piece (21) formed at both sides thereof to form a hinge (a), wherein the second hinge piece (21) of one end of the connection rod (2) is hingeably coupled to the first hinge piece (13) of the coupling member (12) of the lens frame (1) and the first hinge piece (13) of the other end of the connection rod (2) is hingeably coupled to an elastic shaft (33) elastically mounted inside a projecting rod (31) of the temple (3) by a spring (32), whereby the temple (3) can be collapsed inwardly and spread outwardly at a predetermined angle; and side shields (4), each of the side shields (4) having a side plate (41) opened and curved from one side to the other side thereof, a retaining jaw (43) formed at one side end of the side plate (41), and a temple seating portion (42) projecting in a centrally longitudinal direction of the side plate (41) and having upper and lower pressing rods (44), the temple seating portion (42) having a movement space (45) of a predetermined width formed in such a way that one side end thereof extends outwardly inclinedly, wherein the temples (3), the connection rods (2), and the coupling members (12) of the lens frames (1) of the glasses bodies (101) are partially fit into the temple seating portions (42) of the side shields (4) and fastened with the upper and lower pressing rods (44) of the side shields (4).

\* \* \* \* \*